United States Patent
Hallander et al.

(10) Patent No.: US 9,180,979 B2
(45) Date of Patent: Nov. 10, 2015

(54) SMOOTH SURFACE FORMING TOOL AND MANUFACTURE THEREOF

(75) Inventors: Per Hallander, Linköping (SE); Mikael Petersson, Linköping (SE); Björn Weidmann, Borensberg (SE); Tommy Grankäll, Borensberg (SE); Göte Strindberg, Linköping (SE); Pontus Nordin, Linköping (SE)

(73) Assignee: SAAB AB, Linköping (SE)

( * ) Notice: Subject to any disclaimer, the term of this patent is extended or adjusted under 35 U.S.C. 154(b) by 322 days.

(21) Appl. No.: 13/642,898

(22) PCT Filed: Feb. 4, 2010

(86) PCT No.: PCT/SE2010/050136
§ 371 (c)(1),
(2), (4) Date: Oct. 23, 2012

(87) PCT Pub. No.: WO2011/096861
PCT Pub. Date: Aug. 11, 2011

(65) Prior Publication Data
US 2013/0240110 A1    Sep. 19, 2013

(51) Int. Cl.
*B29C 33/02* (2006.01)
*B64F 5/00* (2006.01)
(Continued)

(52) U.S. Cl.
CPC ............... *B64F 5/0009* (2013.01); *B29C 33/40* (2013.01); *B29C 45/73* (2013.01); *B29C 70/443* (2013.01); *B29C 70/88* (2013.01);
(Continued)

(58) Field of Classification Search
CPC ........ B82Y 30/00; B29C 45/26; B29C 45/37; B29C 45/73; H05B 2214/04; B29K 2105/167
USPC ............. 977/778, 779, 788, 789, 833; 249/78
See application file for complete search history.

(56) References Cited

U.S. PATENT DOCUMENTS 4,586,690 A * 5/1986 Hartel et al. ..................... 249/78
5,334,630 A    8/1994 Francis et al.
(Continued)

FOREIGN PATENT DOCUMENTS

DE    19725984 A1    12/1998
EP    1 834 749 A1    9/2007
(Continued)

OTHER PUBLICATIONS

International Preliminary Report on Patentability, dated Mar. 5, 2012, issued in connection with International Application No. PCT/SE2010/050136.
(Continued)

*Primary Examiner* — Scott W Dodds
(74) *Attorney, Agent, or Firm* — Venable LLP; Eric J. Franklin (57) ABSTRACT

An aircraft article composite forming tool and a method for producing the tool. The aircraft article to be formed includes a composite material including an outer surface. The aircraft article composite forming tool includes a matrix laminate made of at least an upper ply including a forming surface for forming the aircraft article and outer surface. The upper ply includes a nano filament structure embedded therein.

8 Claims, 4 Drawing Sheets

(51) Int. Cl.
  *B29C 45/73* (2006.01)
  *B29C 33/40* (2006.01)
  *B29C 70/44* (2006.01)
  *B29C 70/88* (2006.01)
  *B82Y 30/00* (2011.01)
  *B29K 105/16* (2006.01)

(52) U.S. Cl.
  CPC .......... *B29K 2105/165* (2013.01); *B82Y 30/00* (2013.01); *H05B 2214/04* (2013.01); *Y10T 156/10* (2015.01)

(56) References Cited

U.S. PATENT DOCUMENTS

| | | | |
|---|---|---|---|
| 7,437,938 B2 * | 10/2008 | Chakraborty | 73/714 |
| 8,066,842 B2 * | 11/2011 | Farmer et al. | 156/296 |
| 2006/0026996 A1 | 2/2006 | Chen | |
| 2007/0244245 A1 | 10/2007 | Liu et al. | |
| 2010/0062099 A1 * | 3/2010 | Funke et al. | 425/446 |
| 2012/0048472 A1 * | 3/2012 | Glancy et al. | 156/380.9 |

FOREIGN PATENT DOCUMENTS

| | | |
|---|---|---|
| EP | 1 865 553 A2 | 12/2007 |
| JP | 2009-149474 | 9/2009 |
| WO | WO-2007/130979 A2 | 11/2007 |
| WO | WO2008/067809 * | 1/2008 ............. B29C 33/02 |
| WO | WO-2008/097257 A2 | 8/2008 |

OTHER PUBLICATIONS

International Search Report, dated Oct. 13, 2010, issued in connection with International Application No. PCT/SE2010/050136.

Written Opinion of the International Searching Authority, dated Oct. 13, 2010, issued in connection with International Application No. PCT/SE2010/050136.

Kostopoulous, Vassilis, et al., "Carbon nanotube epoxy modified CFRPs: Towards improved mechanical and sensing for multifunctional aerostructures," *SPIE*, vol. 6929, 6929M-1 (2008).

Cebeci, Hülya, et al., "Multifunctional properties of high volume fraction aligned carbon nanotube polymer composites with controlled morphology," *Composites Science and Technology*, vol. 69, pp. 2649-2656 (2009).

Gibson, Thao, et al., "Conductive Nanocomposites: Focus on Lightning Strike Protection.", in Proceedings of the 39th International SAMPE Technical Conference—From Art to Science: Advancing Materials and Process Engineering, Oct. 29, 2007-Nov. 1, 2007.

* cited by examiner

SMOOTH SURFACE FORMING TOOL AND MANUFACTURE THEREOF

CROSS-REFERENCE TO RELATED APPLICATIONS

This application is the national phase under 35 U.S.C. §371 of PCT/SE2010/050136 filed 4 Feb. 2010.

TECHNICAL FIELD

The present invention relates to a composite forming tool and a method of manufacture of the tool.

The invention primary regards manufacturers of aircraft article forming tools for manufacture of aircraft articles having an outer surface designed as an aerodynamic surface.

BACKGROUND ART

Articles, such as composite (or polymeric material) airframe structures of the type wing skins, fin skins, control surfaces, wind turbine blades, open rotor blades etc., having aerodynamic function, are designed and manufactured with a certain surface texture/roughness for enhancing the laminar airflow over the airframe's skin surface (i.e. the outer surface or aerodynamic surface of the article). The outer surface serves as an aerodynamic surface when the article is subjected for an air stream.

It is thus important that the aerodynamic surface is formed in such way that it becomes smooth. A smooth aerodynamic surface of the article gives a low fuel consumption of the aircraft, which is environmental-friendly.

The materials- and manufacturing technology used today, producing such outer surfaces, limits the aerodynamic efficiency of the airframe structures, e.g. regarding the possibility to achieve laminar air flow over a wing, fin, blade, control surface etc.

This can be solved by a proper coating of the airframe providing of a smooth skin surface, wherein the skin friction between the skin surface and the airflow is made as small as possible for achieving an optimal laminar airflow.

This can also be solved by using different techniques including the applications of different types of coatings onto the outer surfaces of the articles or infusions of different compositions into the article forming tool, for making a smooth outer surface of the article.

The articles are often formed and cured in forming tools made of resin matrix materials The blank to be conformed to the article often comprises fibre reinforced resin plies and is formed and cured on the forming surface of the forming tool.

One way to provide the article with a smooth surface is to provide a high surface smoothness of the forming surface of the forming tool for providing a good release of the finished article from the forming surface when the article is removed from the forming tool. A high surface smoothness of the forming surface thus provides for forming an article with high smoothness of the outer surface of the article.

U.S. Pat. No. 5,334,630 describes a mould surface made of phenol-aldehyde resole comprising silica fibres being treated with top coats for providing surface finish of the moulded product.

DE 19725984 describes one way to improve the surface smoothness of the article to be formed. Nano structure reinforced resins in the form of gelcoats are used between the forming surface of the forming tool and the surface of the article to be formed.

An object of the present invention is to provide a forming tool which is cost effective to produce, which forming tool simplifies the article forming procedure in production and promotes for a forming and curing cycle as short as possible for the article to be produced, wherein the finished aircraft article comprises a smooth outer surface (i.e. an optimal natural laminar airflow over the aerodynamic surface is achieved during flight).

It is thus desirable to provide an aircraft article forming tool comprising a forming surface, which forming tool provides a smooth outer surface of the finished article.

It is also desirable to make the forming surface scratch-resistant for preventing scratches in the forming surface, eventually caused by personnel during production, so that the finished aircraft article will have a smooth surface.

It is also desirable to decrease the problem with thermal expansion of the forming tool's forming surface, thereby promoting for a smooth surface of the finished article.

A further object is to provide an aircraft article forming tool which can produce large-scale and/or relatively thick articles having a smooth surface.

It is also an object to provide an aircraft article forming tool, which can produce articles having a complex curvature, which article at the same time will have a smooth outer surface.

A further object is also to eliminate the eventual drawbacks of known techniques.

SUMMARY OF THE INVENTION

This has been achieved by the airframe structure.

Thereby the forming surface of the aircraft article forming tool will be smooth and hard. The smoothness promotes for a smooth aerodynamic surface of the formed aircraft article. The hardness of the forming surface prevents that no scratches of the forming tool's forming surface will be made, even if a highly unlikely event that work-shop personnel by mistake would scratch the surface with a tool etc. By the provided forming surface of the forming tool having a smooth surface, the formed outer surface (aerodynamic surface) will be smooth, which will provide an optimal natural laminar air flow over the outer surface, thereby is achieved less fuel consumption of an aircraft and thus an aircraft article forming tool is provided having environmental friendly properties. The use of CNT provides a well-defined nano structure which promotes a very hard and smooth forming surface.

In such way the nano filament structure in the forming surface also promotes the forming of a smooth outer surface of the aircraft article in one working step. By this way, no complementing working step has to be performed including the application of e.g. gel coats to the forming surface, for achieving a smooth outer surface of the aircraft article.

In such way an optimal mechanical strength of the forming tool is also achieved.

The application of the carbon nano tubes in the forming surface will also increase the form stable property of the matrix laminate. The application of nano filament structures in the forming surface will make the resin content within this area to decrease compared with prior art composite forming tools. This will decrease the coefficient of thermal expansion (CTE) of the matrix laminate. The low CTE of the CNT also promotes the decrease of the CTE of the laminate. The forming surface will thus be form stable due to the nano filament structure arranged in the forming surface of the upper ply. Thus, the matrix laminate will be provided with identical resin properties, both within the laminate and in the forming surface, which promotes for a form stable property with an optimal CTE.

By the application of epoxy, BMI, or other similar polymerics as a polymer material for building the forming tool's composite face sheet including the forming surface, it is possible to produce a large-scale aircraft article forming tool. The composite face sheet can be achieved by means of a vacuum assisted resin transfer mould.

Preferably, it is also possible to produce a composite forming tool made of a lay-up of pre-pregs (pre-impregnated fibre plies laid upon each other and being co-cured).

Preferably, the nano filament structure comprises a portion being exposed in the forming surface.

Alternatively, the nano filament structure is separated from the forming surface by an additional upper ply. The upper ply thus further comprises a layer of resin separating the forming surface from the nano filament structure.

The strength of the forming surface of the forming tool is thereby at the same time very high, which promotes a smooth outer surface of the finished aircraft article. The hard forming surface of the composite face sheet thus keeps the smoothness of the forming surface of the forming tool over a long time period, which is cost-effective.

Suitably, the nano filament structure comprises nano filaments, which are transversally oriented relative the extension of the plane of the upper ply.

In such way is achieved that thermal conductivity in the surface of the forming surface is high due to the nano filament structure positioned in the surface. Thereby the curing time will be short for producing the aircraft article having a double curved aerodynamic surface. These transversally oriented nano filaments will also promote an optimal strength of the matrix laminate in a direction transversal to the extension of the matrix laminate.

When transferring heat to an area of the forming surface being positioned at a great distance from a heat outlet port in an autoclave, wherein said area comprises several plies laid-up onto each other including nano filament structures, said area also will be satisfactory heated from beneath through the laminate matrix, even though the distance from the heat outlet port is large and the hot air therefore has a lower temperature when reaching the underside of the composite face sheet within the region of said area.

Preferably, the matrix laminate further comprises a bottom ply including a nano filament structure.

In this way a so called spring back-effect during production of the matrix laminate can be reduced. During production of the matrix laminate of the forming tool, the nano filament structure will be applied also on the side of the laminate opposite the forming surface, i.e. in that part which is prone for CTE differences in the forming surface (or upper ply). This is made for preventing that residual stress forces of the upper side of the matrix laminate buckle the matrix laminate, i.e. compensating eventual residual stress forces of the applied nano filament structure of the forming surface with a proper amount of nano structure filaments in the matrix laminate's opposite side essentially corresponding with the amount of nano structure filaments in the forming surface.

Suitably, at least a portion of the nano filament structure is coupled to an energy supply for heating the forming surface, wherein the nano filaments have such a distance between each other so that the electrical resistance increases.

In such way the nano filament structure in the forming surface of the forming tool can be provided with an additional heat for faster curing of the blank to be formed. This promotes for a cost-effective production of aircraft articles comprising smooth outer surfaces.

Alternatively, the carbon nano tubes (CNT's) can be coated with a suitable electric conductive, semi-conductive or insulating material before being used in the forming tool manufacturing in order to have a suitable electrical resistivity.

Preferably, the nano filament (CNT, nano fibre, nano multi wall filament, nano double wall filament, nano wire etc.) has a length of 0.125 mm or less. This is suitable for a common pre-preg ply having a thickness of 0.125 mm used in the production of aircrafts. If leaning, or in the plane oriented nano filaments are used, the length preferably can be longer. The definition of nano means that a filament particle has at least one dimension not more than 200 nm. 1 nm (nanometre) is defined as $10^{-9}$ metre (0.000 000 001 meter). Preferably, the diameter of a multiwall nano tube is 15-35 nm, suitably 18-22 nm. Suitably, the diameter of a single wall nano tube is 1.2-1.7 nm, preferably 1.35-1.45 nm.

The article is preferably made of a resin matrix, which comprises a laminate of plies. Each ply may comprise fibres (in the present application also can be called large fibres or traditional laminate reinforcing fibres) having an orientation different from—or identical with—the large fibre orientation of an adjacent ply (the diameter of the large fibre is approximately 6-8 micro metres).

Preferably, the energy supply is controllably coupled to at least two portions of the nano filament structure.

Thereby a controlled forming of an aircraft article comprising a smooth outer surface is provided. A blank to be conformed to an aircraft article, which has a complex form comprising curvatures requiring different curing temperatures (and/or forming temperatures), can thus in a controllable manner be given specific temperatures in certain areas requiring said temperatures.

Suitably, the nano filament structure is adapted as a forming surface temperature detector.

Preferably, sensors are provided in the forming surface of the forming tool for providing signals to a control unit controlling the generation of different temperatures of the at least two nano filament structure portions by means of different voltage.

Suitably, the matrix laminate comprises a plurality of laid-up plies, each comprising a nano filament structure.

This means that a thermal conductivity is achieved transversally through the matrix laminate of the forming tool. During curing of the formed blank in an oven or autoclave, heat of hot air blown under the forming tool (on the opposite side relative the forming surface of the composite face sheet) will thus be conducted to the blank in an effective way promoting for a short curing of the blank.

Preferably, a first conductive nano filament structure is arranged as a first heater of the matrix laminate and a second conductive nano filament structure is arranged as a second heater of the matrix laminate. The heaters' conductive properties differ from each other (by arranging the nano filaments in certain directions and concentrations) so that different amount of heat will be transferred to the forming surface in different positions. The position of each heater is elected from the knowledge where it is desirable to achieve a specific heat for forming and/or curing the blank in that area. This can be achieved by arranging the conductive nano filaments (e.g. carbon nano tubes, nano fibres, nano wires etc.) such that, within the area of the first conductive nano filament structure, the nano filaments have a closer distance between each other (than between the conductive nano filaments in the second conductive nano filament structure) to such degree that the resistance increases, but not to such degree that the conductivity ceases.

The conductive nano filaments of the first conductive nano filament structure are preferably oriented parallel with the forming surface and in the desired current conducting direction, wherein the first conductive nano filament structure works more as a conductor than as a heating element. The conductive nano filaments of the second conductive nano filament structure are preferably oriented more transverse relative the forming surface than the conductive nano filaments of the first conductive nano filament structure, thus concentrating the heat to the forming surface.

Alternatively, the nano filament structure comprises carbon nano tubes.

Thereby a well-defined nano structure is achieved for the forming surface having an optimal mechanical strength. The well-defined dimensions of the carbon nano tubes promotes for a nano structure layer of the upper ply which can be as thin as possible.

Preferably, the CTE of the aircraft article composite forming tool can be the same as, larger than or smaller than the CTE of the aircraft article to be produced.

The invention also regards a method of producing the aircraft article composite forming tool, which method comprises the steps of building a lay-up of fibre reinforced resin pre-impregnated plies and impregnating a dry nano filament structure mat being arranged on the upper ply.

By using fibre reinforced epoxy for building the forming tool, a cost-effective production of the tool is achieved.

By means of vacuum assisted resin transfer mould it is possible to produce a large-scale forming tool comprising a large composite face sheet. It is also possible to produce a composite forming tool by a stack of so called pre-pregs (pre-impregnated fibre plies).

Preferably, the step of impregnating the dry nano reinforcing structure is performed by means of the resin being comprised in upper layer's fibre reinforced resin pre-impregnated ply.

Suitably, further dry nano reinforcing structures are impregnated with resin in all fibre reinforced resin pre-impregnated plies.

Preferably, the dry nano reinforcing structure comprises carbon nano tubes or carbon nano fibres.

Suitably, the nano filament structure is grown direct on, and with transversal direction relative, the large fibres of the upper lay-up ply.

Preferably, the upper ply comprises a nano filament structure, wherein the upper ply is laid onto the lay-up of plies.

Alternatively, the step of impregnating the dry nano filament structure is performed as an injection step.

In such way the production of the aircraft article forming tool's composite face sheet can be performed in one working step which is cost-effective.

BRIEF DESCRIPTION OF THE DRAWINGS

The present invention will now be described by way of examples with references to the accompanying schematic drawings, of which.

DETAILED DESCRIPTION

Hereinafter, embodiments of the present invention will be described in detail with reference to the accompanying drawings, wherein for the sake of clarity and understanding of the invention some details of no importance are deleted from the drawings. Also, the illustrative drawings show nano structures of different types, being illustrated extremely exaggerated and schematically for the understanding of the invention. The conductive nano structures are illustrated exaggerated in the figures also for the sake of understanding of the orientation and the alignment of the conductive nano filaments.

Figure 1A:
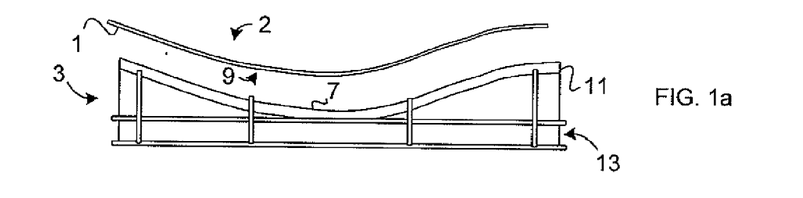
FIGS. 1a-1b illustrate an aircraft article composite forming tool made of fibre reinforced resin plies lay-up comprising a nano filament structure in the upper ply.

FIG. 1a schematically illustrates a blank 1 to be formed on a composite forming tool 3. The blank 1 shown in FIG. 1a comprises carbon fibres with different fibre orientations. The blank 1 is formed and cured on a forming surface 7 of the composite forming tool 3. The finished article formed of the blank is an aircraft article 2. The aircraft article is thus made of fibre reinforced resin matrix material and includes an outer surface 9 used as an aerodynamic surface of the aircraft article 2.

Figure 1B:
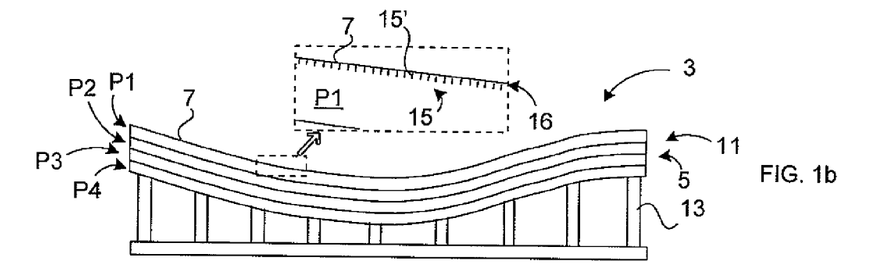

The aircraft article composite forming tool 3 shown in FIG. 1b comprises a matrix laminate 11 made of a lay-up 5 of resin plies P1, P2, P3, P4 (shown exaggerated in cross-section). The upper ply P1 includes the forming surface 7 for forming the aircraft article. The forming surface 7 of the composite forming tool 3 is thus adapted to form the outer surface (aerodynamic surface) of the aircraft article. The composite forming tool's 3 forming part is thus the matrix laminate 11, comprising the forming surface 7.

The composite forming tool 3 further comprises a support 13 for supporting the matrix laminate 11 (composite face sheet) for achieving a rigid forming tool 3. The upper ply P1 comprises a nano filament structure 15 comprising carbon nano tubes 15' embedded therein such that upper ends of the carbon nano tubes 15' are exposed in the forming surface 7. The carbon nano tubes 15' are oriented transversal relative the extension of the upper ply P1.

Thereby the achieved strength and the achieved smoothness of the forming surface 7 will be high, which will promote for a smooth outer surface 9 (aerodynamic surface) of the finished aircraft article. The hard forming surface 7 prevails the smoothness of the forming surface of the aircraft article composite forming tool 3 over a long time period, which is cost-effective. The increased strength promotes for a scratch resistant forming surface 7 of the aircraft article composite forming tool 3. The achieved smoothness also promotes for an easy release of the finished aircraft article (not shown in FIG. 1*b*) from the aircraft article composite forming tool 3.

The transversal orientation of the carbon nano tubes 15' promotes for an optimal strength of the matrix laminate 11 in the forming surface 7 in a direction transverse relative the extension of the upper ply P1.

The application of the carbon nano tubes 15' in the forming surface 7 will also increase the form stable property of the matrix laminate 11. The application of carbon nano tubes 15' in the forming surface 7 will make the resin content within this area to decrease compared with prior art composite forming tools. This feature will decrease the coefficient of thermal expansion (CTE) in the matrix laminate 11. The forming surface 7 will thus be form stable due to the nano filament structure 15 arranged in the upper ply P1. In such way, the matrix laminate 11 will be provided with identical resin properties, both within the matrix laminate 11 and in the forming surface 7. Thereby is provided a form stable characteristic with an optimal CTE of the matrix laminate 11.

By means of the carbon nano tubes 15' applied in the forming surface 7 of the aircraft article composite forming tool 3 is also achieved that the thermal conductivity in the forming surface 7 will be high due to the carbon nano tubes 15' positioned in the forming surface 7. Thereby the curing time will be short for curing the formed blank into the aircraft article.

Figure 2:
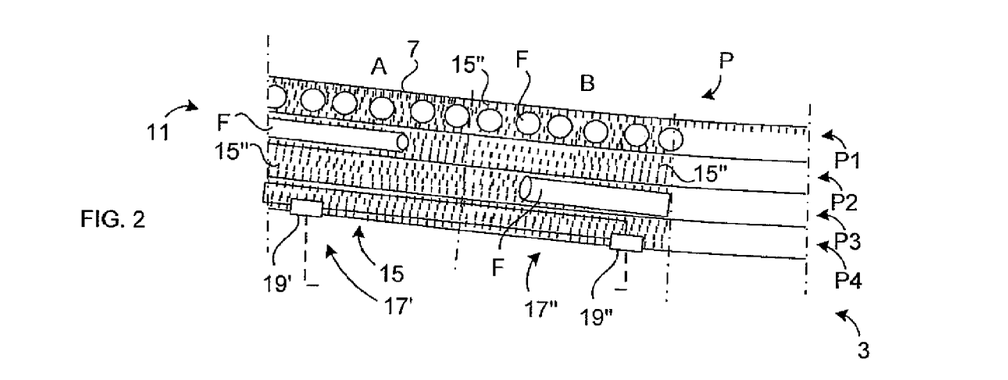
FIG. 2 illustrates a portion of an aircraft article composite forming tool's face sheet further comprising sets of heating elements built of nano filament structures for controllable forming and curing of the blank.

FIG. 2 schematically illustrates an aircraft article composite forming tool 3 further comprising sets 17', 17" of heating elements comprising carbon nano fibres 15" for controllable forming and curing the blank into the aircraft article (not shown) having a smooth outer surface. The aircraft article composite forming tool 3 is made of a matrix laminate 11 of plies P1, P2, P3, P4 (only four plies are shown). Each ply P1, P2, P3, P4 comprises "large" prolonged carbon fibres F, wherein the carbon fibres F of adjacent plies have different orientations to each other. The carbon fibres F are oriented parallel with the plane P of the plies. The plies P1, P2, P3, P4 of the matrix laminate 11 within a first area A of the forming surface 7, each comprises carbon nano fibres 15" being thermally associated with a first heating source 19' for generating heat within the area A. The plies P1, P2, P3, P4 of the matrix laminate 11 within a second area B of the forming surface 7, each comprises carbon nano fibres 15" being thermally associated with a second heating source 19" for generating heat within the area B, with a different temperature than area A. For example, if the curvature of the aircraft article (not shown) to be formed requires a first temperature of the blank (not shown) within this area A and a second temperature in the other area B, the area A will be set to a different temperature than area B by means of the heating sources 19', 19".

Thereby the aircraft article composite forming tool 3 simplifies the aircraft article forming procedure in production and promotes for a forming and curing cycle as short as possible for the aircraft article to be produced, wherein the finished aircraft article (as an example of which is shown with reference 2 in FIG. 1*a*) comprises a smooth aerodynamic surface.

Figure 3A:
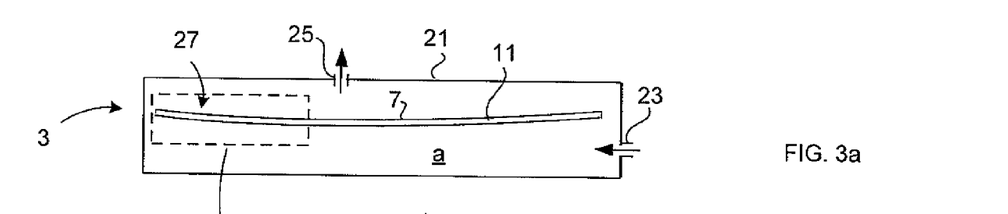
FIGS. 3a-3b illustrate an aircraft article composite forming tool for production of large-scale aircraft articles in an autoclave.
Figure 3B:
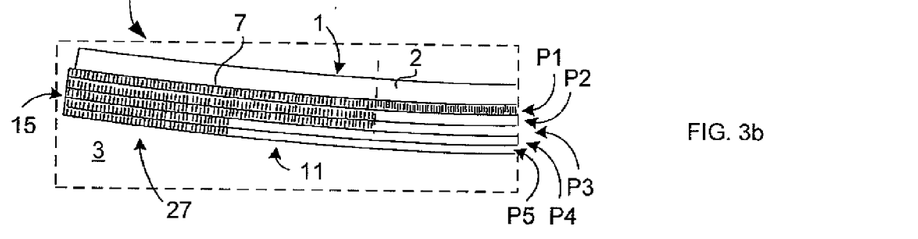

FIG. 3*a* schematically illustrates an aircraft article composite forming tool 3 for production of a large-scale aircraft article 2 (see FIG. 3*b*) in an autoclave 21. Large-scale aircraft articles 2 are in this case defined as a shell laminate, such as a wing shell. The large-scale aircraft article 2 could also be a continuous elongated wing beam. The blank 1 to be formed and cured is applied onto the forming surface 7 of the aircraft article composite forming tool 3 and is placed in the autoclave 21. The autoclave 21 comprises a hot air inlet port 23 for curing the blank 1 and an air outlet port 25. By arranging the aircraft article composite forming tool's 3 matrix laminate 11 with a nano filament structure 15 (see FIG. 3*b*) extending through the thickness of the matrix laminate 11 and within a portion 27 furthest away from the hot air inlet port 23 of the autoclave 21, the thermal conductivity through the aircraft article composite forming tool 3 will be increased within this remote portion 27. This promotes that hot air with lower temperature (than in a portion near the hot air inlet port 23) in this remote portion 27 of the autoclave 21 still will provide the blank 1 with a sufficient curing temperature even if this remote portion 27 is at a long distance from the hot air inlet port 23. The transversal orientation of the nano filament structure 15 promotes for an optimal thermal conductivity. In FIG. 3*b* is schematically shown a step-wise arrangement of nano filament structures 15 in the plies P1, P2, P3, P4, P5 of the matrix laminate 11 of the aircraft article composite forming tool 3 in such way that the remote portion 27 of the matrix laminate 11 being furthest away from the hot air inlet port 23 will have nano filament structures 15 all through the thickness of the matrix laminate 11.

Figure 4:
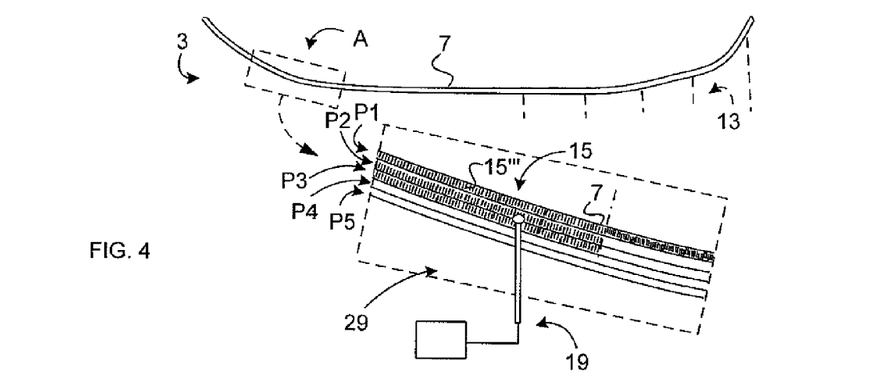
FIG. 4 illustrates an aircraft article composite forming tool comprising an additional heating element for promoting the forming of complex aircraft article curvatures having smooth surfaces.

FIG. 4 schematically illustrates an aircraft article composite forming tool 3 comprising a controllable heating element 29 made of a nano filament structure 15 comprising carbon multi-wall nano tubes 15''' arranged in several plies P1, P2, P3 of the matrix laminate 11 within an area A of the forming surface 7 provided for forming a relatively sharp curvature of the aircraft article (not shown) to be formed. The supports 13 are arranged to provide the matrix laminate 11 of the composite face sheet with proper curvature and maintain its shape. The nano filament structure 15 of the heating element 29 is thermally connected to a heating source 19. Thereby the aircraft article composite forming tool 3 simplifies the aircraft article forming procedure in production and promotes for a forming and curing cycle as short as possible for the aircraft article (not shown) to be produced, wherein the finished aircraft article comprises a smooth outer surface.

Figure 5:
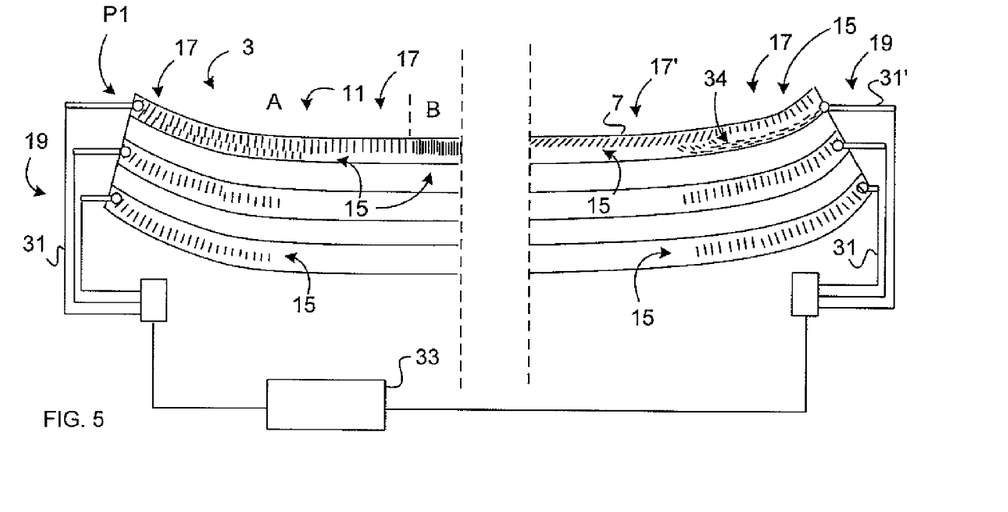
FIG. 5 illustrates an aircraft article composite forming tool comprising individually controlled sets of heating elements of nano filament structures having different conductive properties.

FIG. 5 schematically illustrates an aircraft article composite forming tool 3 comprising individually controlled sets 17 of heating elements comprising nano filament structures 15 having different conductive properties. The matrix laminate's 11 upper ply P1 comprises in area A transversally oriented nano filament structures 15. Area B of the matrix laminate 11 includes nano filament structures 15, the filaments of which are so dense arranged that they form a thermally isolating forming surface generating less temperature. The area A comprises nano filament structures, each electrically coupled to a controllable heating source 19. Each group of nano filament structures 15 generates heat when a current is fed through the nano filament structure 15 via electrical wires 31. A control unit 33 controls the temperature level of the matrix laminate 11 of the aircraft article composite forming tool 3 for an efficient curing of the blank (not shown). Thereby the aircraft article composite forming tool 3 simplifies the aircraft article forming procedure in production and promotes for a forming and curing cycle as short as possible for the aircraft article to be produced, wherein the finished aircraft article comprises a smooth surface for optimal natural laminar airflow over the outer surface (not shown). A part 34 of the nano filament structure 15 is adapted to transfer electricity from wire 31' to the set 17' of heating elements.

Figure 6:
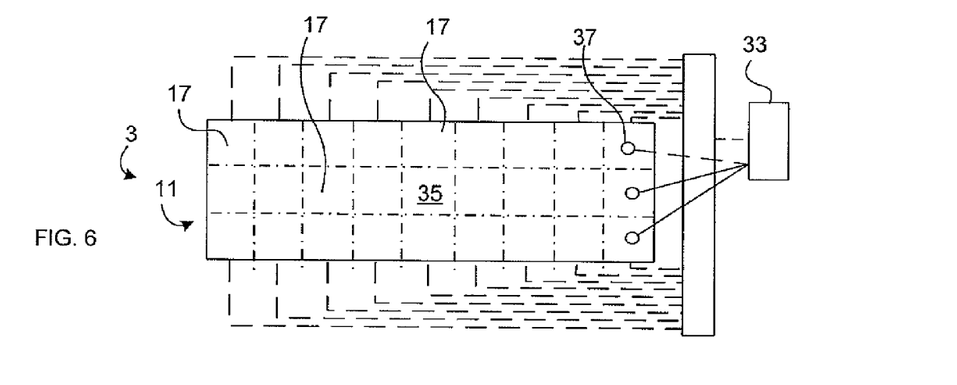
FIG. 6 illustrates from above an aircraft article composite forming tool comprising sets of heating nano filament structures activated in response to actual blank temperature.

FIG. 6 schematically illustrates from above an aircraft article composite forming tool 3 comprising sets 17 of heating nano filament structures 15 having thermal conductivity properties, which are activated in response to the actual blank temperature. The matrix laminate 11 is provided with a grid 35 of sensors 37 and heating element sets 17 (nano filament structures 15 each coupled to a control unit 33). Thereby the aircraft article composite forming tool 3 simplifies an aircraft article forming procedure in production and promotes a forming and curing cycle as short as possible for the aircraft article to be produced, wherein the finished aircraft article comprises a smooth outer surface. The application of the heating element sets 17 made of nano filament structures in the forming surface 7 increases the form stable property of the matrix laminate 11, decreasing the coefficient of thermal expansion (CTE) of the matrix laminate 11.

Figure 7A:
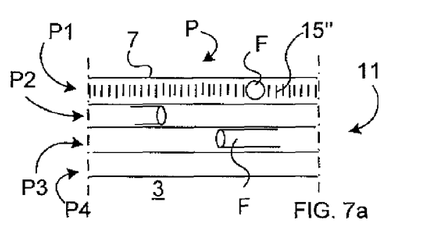
FIGS. 7a-7g illustrate cross-sections of aircraft article composite forming tools having different types of nano structures.

FIG. 7a schematically illustrates in cross-section a portion of a matrix laminate 11 comprising traditional (large) glass fibres F, each ply P1, P2, P3, P4 has glass fibres F with a specific orientation parallel with the plane P of the matrix laminate 11. Carbon nano fibres 15" are applied in the upper ply P1 of the matrix laminate 11 for additionally strengthening of the aircraft article composite forming tool 3. The application of the carbon nano fibres 15" in the forming surface increases the form stable property of the matrix laminate 11, decreasing the coefficient of thermal expansion (CTE) in the matrix laminate 11.

Figure 7B:
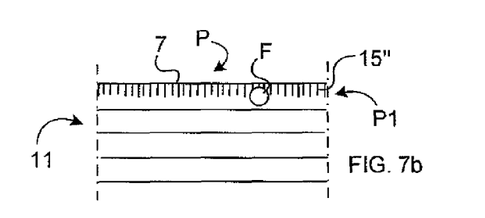

FIG. 7b schematically illustrates in cross-section a portion of a matrix laminate 11 of the type described in FIG. 7a, but with the carbon nano fibres 15" also exposed in the forming surface 7. The application of the carbon nano fibres 15" in the forming surface increases the form stable property of the matrix laminate 11, decreasing the coefficient of thermal expansion (CTE) in the matrix laminate 11. The partly exposed carbon nano fibres 15" contribute to the achievement of a hard forming surface 7.

Figure 7C:
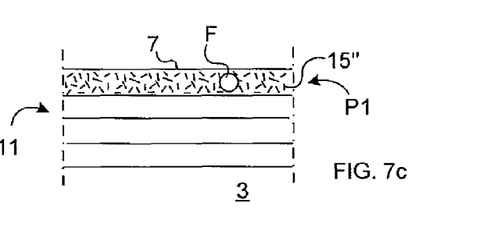

FIG. 7c schematically illustrates in cross-section a portion of a matrix laminate 11 of the type described in FIG. 7a, but with carbon nano fibres 15" oriented at random in the upper ply P1. The application of the carbon nano fibres 15" in the forming surface increases the form stable property of the matrix laminate 11, decreasing the coefficient of thermal expansion (CTE) in the matrix laminate 11.

Figure 7D:
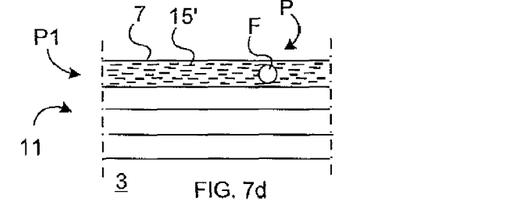

FIG. 7d schematically illustrates in cross-section a portion of a matrix laminate 11 of the type described in FIG. 7a, but with carbon nano tubes 15' oriented essentially parallel with the plane P of the upper ply P1. The carbon nano tubes 15' of the upper ply P1 increases the form stable property of the matrix laminate 11, decreasing the coefficient of thermal expansion (CTE) in the matrix laminate 11, and thus a proper forming surface 7 for forming an aircraft article comprising a smooth aerodynamic surface.

Figure 7E:
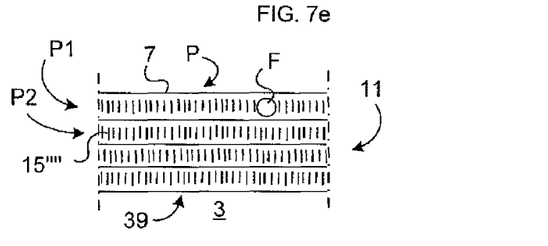

FIG. 7e schematically illustrates in cross-section a portion of a matrix laminate 11 comprising transversally oriented carbon nano wires 15'''' in each ply P1, P2, P3, P4. The transversally oriented carbon nano wires 15'''' in each ply P promote an efficient thermal transport of heat from the matrix laminate's 11 underside 39 to the forming surface 7 at the same time as the strength in z-direction perpendicular to the direction of the extension of the matrix laminate 11 will increase.

Figure 7F:
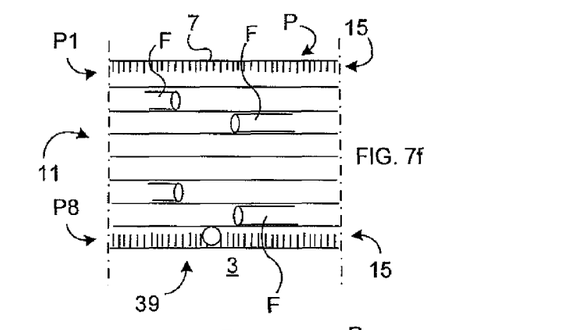

FIG. 7f schematically illustrates in cross section a portion of a matrix laminate 11 further comprising a bottom ply P8 including a nano filament structure 15. In this way a so called spring back-effect during production of the matrix laminate 11 will be prevented. During production of the matrix laminate 11 of the aircraft article forming tool 3, the nano filament structure 15 will be applied also on the side of the matrix laminate 11 opposite the forming surface 7. This is made for preventing that eventual residual stress forces of the upper side of the matrix laminate 11 buckle the matrix laminate 11, i.e. compensating eventual residual stress forces of the applied nano filament structure 15 in the forming surface 7 with a proper amount of nano filaments in the matrix laminate's 11 opposite side (underside 39) essentially corresponding with the amount of nano filaments in the forming surface 7.

Figure 7G:
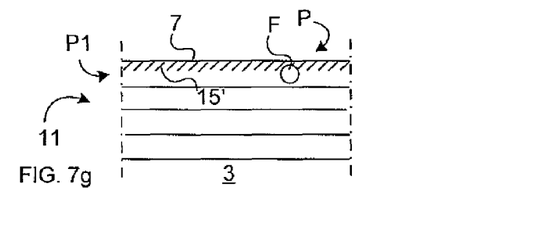

FIG. 7g schematically illustrates in cross section a portion of a matrix laminate 11 of an aircraft article composite forming tool 3 having (relative the plane P of the laminate 11) leaning carbon nano tubes 15' applied in the forming surface 7 of the composite face sheet comprised of the matrix laminate 11. The carbon nano tubes 15' of the upper ply P1 increases the form stable property of the matrix laminate 11, decreasing the coefficient of thermal expansion (CTE) in the matrix laminate 11, and thus a proper forming surface 7 of the aircraft article composite forming tool 3 for forming an aircraft article comprising a smooth aerodynamic surface. At the same time the forming surface 7 will be scratch-resistant for preventing scratches in the forming surface 7, eventually caused by personnel during production, so that the finished aircraft article (not shown) is guaranteed to have a smooth aerodynamic surface.

Figure 8:
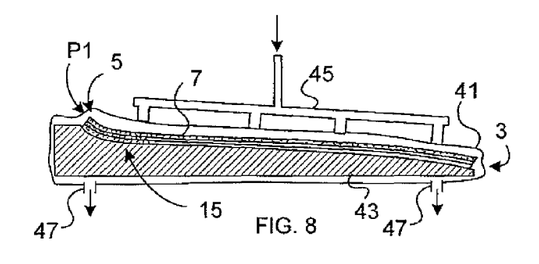
FIG. 8 illustrates the production of an aircraft article composite forming tool made by application of a dry nano structure mat onto the upper ply and resin infusion in a vacuum bag.

FIG. 8 schematically illustrates the production of an aircraft article composite forming tool 3 (composite face sheet) including the step of application of a dry nano filament structure mat onto the upper ply P1 and resin injection by means of a vacuum bag 41. The production is made by a few steps including a building of a lay-up 5 of fibre reinforced resin pre-impregnated plies P1, P2 . . . Pn. The lay-up 5 is positioned on the male tool 43. The arranged lay-up 5 is enclosed within the vacuum bag 41. The vacuum bag 41 is connected to a resin supply system 45 for impregnating the dry nano filament structure mat being arranged on the upper ply P1 with a resin fed from the resin supply system 45. Vacuum is provided within the vacuum bag 41 via suction ports 47 for infusion of the dry nano structure with the resin. The vacuum assisted resin transfer makes it possibly to produce a large-scale aircraft article composite forming tool 3 comprising a large composite face sheet. When the resin has filled all air spaces between the dry nano filaments, the composite face sheet (being comprised of the aircraft article composite forming tool 3) is cured and thereafter the composite face sheet is removed from the male tool 43. The composite face sheet is ready to use for forming aircraft articles comprising a smooth outer surface. The composite face sheet of the aircraft article composite forming tool is traditionally mounted to a support (not shown). By using fibre reinforced epoxy for building the forming tool, a cost-effective production of the tool is achieved. The production of the aircraft article composite forming tool 3 (composite face sheet) is performed in one working step which is cost-effective.

Figure 9:
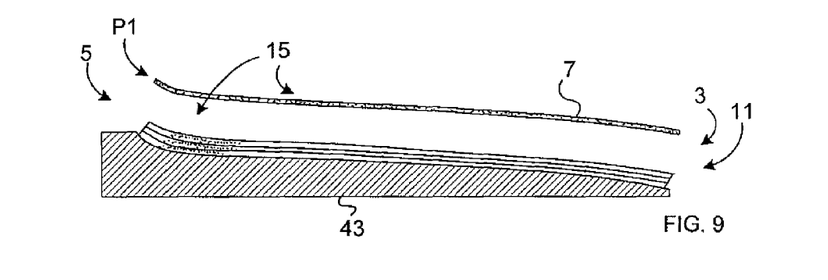
FIG. 9 illustrates the production of an aircraft article composite forming tool made by application of a resin lay-up beforehand prepared with a nano structure.

FIG. 9 schematically illustrates the production of an aircraft article composite forming tool 3 achieved by the application of a fibre reinforced resin lay-up (upper ply P1), which is beforehand prepared with a nano filament structure 15. The upper ply P1 thus comprises a nano filament structure 15, wherein the upper ply P1 is laid onto the lay-up 5 of plies. Thereafter the plies are co-cured and the use of the aircraft article composite forming tool 3 promotes the production of aircraft articles comprising a smooth outer surface (aerodynamic surface). Embedded sets of heating elements (not shown) comprising nano filament structures having different conductive properties within the matrix laminate 11 also promotes an effective production of aircraft articles comprising a smooth outer surface. The application of the heating elements made of nano filament structure 15 in suitable positions of the matrix laminate 11 also promotes the cost-effective production of the aircraft article composite forming tool per se wherein complex and/or large scale aircraft articles can be produced with a smooth surface. The smooth surface of the forming surface 7 will also promote a simple release of the finished aircraft article which is cost-effective.

Figure 10A:
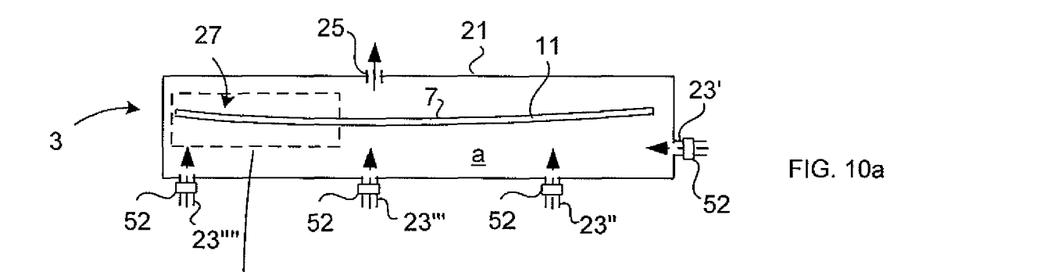
FIGS. 10a-10b each illustrates an embodiment of a forming tool in an autoclave having passive thermo couples for detecting the actual temperature in different zones of the forming surface.
Figure 10B:
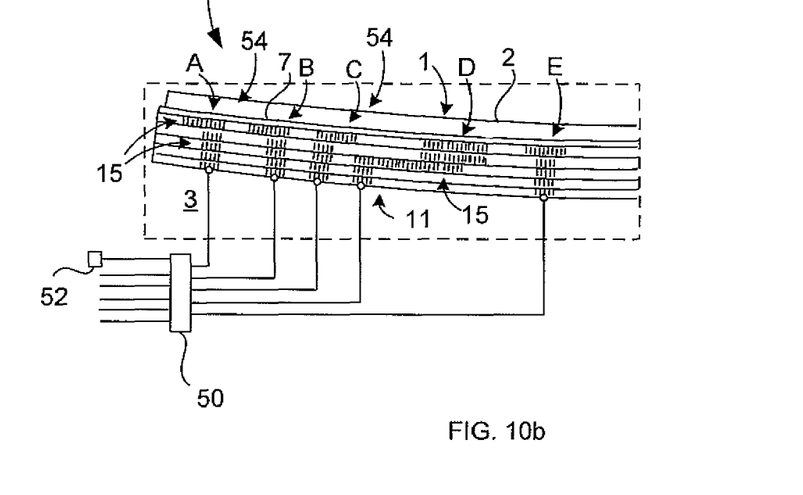

FIG. 10a schematically illustrates a forming tool in an autoclave having passive thermo couples for detecting the actual temperature in different zones of the forming surface. According to this embodiment, the forming tool includes a further ply arranged onto the upper ply separating the forming surface 7 from the nano filament structure 15, as being shown in FIG. 10b. The blank 1 to be formed and cured is applied onto the forming surface 7 of the aircraft article composite forming tool 3 and is placed in the autoclave 21. The autoclave 21 comprises an air outlet port 25. The autoclave in FIG. 10a further comprises several individually controlled hot air inlet ports 23', 23", 23''', 23''''. The hot air flow is controlled by valves 52 coupled to a control unit 50 (see FIG. 10b). The control unit 50 is coupled to individual passive thermo couples made of nano filament structures 15, which act as forming surface temperature detectors 54. Each zone A, B, C, D etc. is thus monitored regarding the actual temperature of the forming surface. The application of the nano filament structures as thermo couples (temperature detectors 54) is cost effective and the forming surface 7 of the forming tool 3 can be made hard and smooth, while the forming tool 3 per se includes said temperature detectors 54. If the temperature detector 54 in zone A detects a low temperature (in comparison with a predetermined temperature value) in this area, the control unit 50 will control the valve 52 for zone A to feed an increased hot air flow via the hot air port inlet port 23'''', until the temperature has reached the predetermined temperature for zone A. If the temperature detector 54 in zone A detects a high temperature (in comparison with a predetermined temperature value) in this area, the control unit 50 will control the valve 52 for zone A to feed a decreased hot air flow via the hot air port inlet port 23'''', until the temperature has reached the predetermined temperature for zone A, and so on. The transversal orientation of the nano filament structure 15 promotes for an optimal thermal conductivity.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims.

The nano structure filaments can be embedded in the upper ply in such way that a portion of the nano filaments is exposed in the forming surface. This means that a portion of the nano structure is exposed in the forming surface meaning that the filaments, including a first and second end, of that portion are exposed. They may thus expose their first ends in the forming surface.

A typical composite face sheet made of CFRP or similar material could, as an example, be cured in a male tool. The surface layer (precured or uncured) of the composite face sheet (part of the aircraft article composite forming tool) can be placed in the male tool before the curing operation to form the outer layer of the cured composite face sheet. The nano filament structure reinforcing the surface layer can be integrated in the lay-up and curing of the composite airframe component. The nano filament structure surface layer can also be applied as a spray-on layer (e.g. by electro-static painting) or separately manufactured layer that is attached to the composite face sheet forming surface after curing.

The CNT's can be produced by emerging CNT technology resulting in grown forests of CNT for high efficiency. It is known that CNT's preferably are grown in the shape of "forests" (mats of aligned CNT's) with vertical, tilted or horizontally arranged nano tubes. Combinations of these arrangements are also possible, e.g. as two or more separate layers stacked on top of each other. It is also possible to grow CNT's as well-defined patterns, suited for the intended application. The term CNT is this application includes all types of carbon nano tubes. These can be single-wall, double-wall or multi-wall nano tubes. In addition, CNT-like materials like graphene, graphone and similar carbon-based materials with suitable electrical and thermal properties can be used. The composite matrix of the outer ply/outer layer (forming surface) can be epoxy, polymides, bismaleimides, phenolics, cyanatester, PEEK, PPS, polyester, vinylester and other curable resins or mixtures thereof. If used, the large fibre structure may be of ceramic, carbon and metal or mixtures thereof.

Plies comprising the nano filament structure can be applied to the forming surface of an existing, already manufactured and assembled aircraft article composite forming tool. The application can be made by means of adhesive bonding or co-cured or co-bonded on the forming surface.

The invention claimed is:

1. An aircraft article composite forming and curing tool, wherein an aircraft article to be formed comprises a composite material including an outer surface, the aircraft article composite forming tool comprising:
a cured matrix laminate, being a polymeric composite face sheet, comprising an upper ply including a forming surface for forming said aircraft article outer surface, wherein the upper ply comprises a nano filament structure embedded therein, wherein the matrix laminate comprises a plurality of laid-up plies, a portion of the laid-up plies comprising a nano filament structure and controllable heating elements comprising nano filament structure in suitable positions of the matrix laminate, such that a portion of the nano filament structure is exposed on the forming surface, and wherein at least a portion of the nano filament structure is coupled to an energy supply to heat the forming surface.

2. The aircraft article composite forming and curing tool according to claim 1, wherein the nano filament structure comprises nano filaments, which are transversally oriented relative the extension of the plane of the upper ply.

3. The aircraft article composite forming and curing tool according to claim 1, wherein the nano filaments coupled to the energy supply are arranged with various distances between each other to vary resistance and heat generated by the nano filaments at different positions on the forming surface.

4. The aircraft article composite forming and curing tool according to claim 3, wherein the energy supply is controllably coupled to at least two portions of the nano filament structure.

5. The aircraft article composite forming and curing tool according to claim 1, wherein the nano filament structure is adapted as a forming surface temperature detector.

6. The aircraft article composite forming and curing tool according to claim 1, wherein the nano filament structure comprises carbon nano tubes.

7. The aircraft article composite forming and curing tool according to claim 6, wherein the carbon nano tubes are adapted for electrical conductivity.

8. The aircraft article composite forming and curing tool according to claim 6, wherein the carbon nano tubes are adapted for thermal conductivity.

* * * * *